United States Patent
Princell et al.

(10) Patent No.: US 6,428,651 B1
(45) Date of Patent: Aug. 6, 2002

(54) METHOD AND APPARATUS FOR APPLYING ADHESIVES TO THE EDGES OF A SLIT TUBE

(75) Inventors: Charles M. Princell, Hickory; Bill Alvey, Conover; Steve A. Fox; Robert L. Campbell, Jr., both of Hickory, all of NC (US)

(73) Assignee: Plastic Technology, Inc., Hickory, NC (US)

( * ) Notice: Subject to any disclaimer, the term of this patent is extended or adjusted under 35 U.S.C. 154(b) by 0 days.

(21) Appl. No.: 09/560,407

(22) Filed: Apr. 27, 2000

(51) Int. Cl.⁷ .......................... B32B 31/12; B29C 53/50
(52) U.S. Cl. ................... 156/259; 156/289; 156/510; 156/517; 156/518; 156/578
(58) Field of Search .................... 156/203, 250, 156/256, 259, 289, 510, 545, 512, 578, 518, 517

(56) References Cited

U.S. PATENT DOCUMENTS

| | | |
|---|---|---|
| 2,717,848 A | 9/1955 | Jaye |
| 4,022,248 A | 5/1977 | Hepner et al. |
| 4,243,453 A | 1/1981 | McClintock |
| 4,389,270 A | 6/1983 | McClintock |
| 4,584,217 A | 4/1986 | McClintock |
| 4,606,957 A | 8/1986 | Cohen |
| 4,748,060 A | 5/1988 | Fry et al. |
| 4,772,507 A | 9/1988 | Leo, Jr. et al. |
| 4,778,703 A | 10/1988 | Fontanilla |
| 4,823,845 A | 4/1989 | Martin et al. |
| 4,842,908 A | 6/1989 | Cohen et al. |
| 4,874,648 A | 10/1989 | Hill et al. |
| 4,937,111 A | 6/1990 | Fontanilla |
| 4,946,732 A | 8/1990 | Cohen et al. |
| 5,006,185 A | 4/1991 | Anthony et al. |
| 5,141,793 A | 8/1992 | Fontanilla |
| 5,143,574 A | 9/1992 | Knittel et al. |
| 5,360,048 A | 11/1994 | Lauer |
| 5,417,901 A | 5/1995 | Hartman et al. |
| 5,421,371 A | 6/1995 | Lauer |
| 5,427,849 A | 6/1995 | McClintock et al. |
| 5,558,739 A | 9/1996 | Clark |
| 5,605,593 A | 2/1997 | Lauer |
| 5,690,147 A | 11/1997 | Cridland et al. |
| 5,783,274 A | 7/1998 | Knittel et al. |
| 5,806,188 A * | 9/1998 | Caraballo |
| 5,904,970 A | 5/1999 | Lauer et al. |
| 5,934,337 A | 8/1999 | Fiala et al. |
| 5,964,252 A | 10/1999 | Simmons et al. |

* cited by examiner

*Primary Examiner*—Curtis Mayes
(74) *Attorney, Agent, or Firm*—Alston & Bird LLP

(57) ABSTRACT

A method and apparatus for applying adhesive the edges of a slit tubular body as the tubular body is advanced along a path of travel is provided. The apparatus includes a tape feed for feeding a release tape having an adhesive applied to a surface thereof, a cutting blade for forming a slit having opposing edges in the tubular body such that the cutting blade is interposed between the opposing edges, and a housing member positioned along the path of travel. The housing member is positioned for directing the release tape along the exterior surface of the housing member in a line parallel to the path of travel of the tubular body such that the adhesive is applied to the at least one of the opposing edges of the slit. The housing member is further positioned for covering at least a portion of the cutting blade and separating at least one of the edges of the slit from the cutting blade to reduce frictional engagement of the cutting blade with the tubular body.

40 Claims, 10 Drawing Sheets

METHOD AND APPARATUS FOR APPLYING ADHESIVES TO THE EDGES OF A SLIT TUBE

FIELD OF THE INVENTION

The present invention relates to pipe insulation, and more particularly to a method and apparatus for applying adhesive to the edges of a slit extending along a tubular body of pipe insulation.

BACKGROUND OF THE INVENTION

Flexible foam pipe insulation is well known in the art. The insulation is usually formed into a tube by extruding a foamed polymeric material, such as polyethylene, polypropylene, vinyl resin, polyurethane, polystyrene, or other related plastic materials. The extruded tube typically has a microcellular composition created by adding a blowing or foaming agent to the polymeric material. The blowing or foaming agent is incorporated into the polymeric material at a higher pressure and foams as the pressure is reduced, such as when the polymeric material passes through a die head during the extrusion process.

Typically, the tube is then cut into sections and allowed to cure to solidify the microcellular structure of the foamed polymeric material. After the tube has cured, further processing is performed. Conventionally, the tube is slit longitudinally by a slitter, such as a stationary or rotating blade. Glue or adhesive is also applied to the edges of the slit so that the edges can be secured together once the tube is placed around a pipe that is desired to be insulated.

One problem suffered by conventional systems is a poor approach to forming the longitudinal slit in the tube. The slit is typically formed by feeding the tube through the slitter such that the slitter penetrates into the hollow center portion of the tube. As the tube is slit, the edges rub against the slitter, thus generating a high amount of friction and heat. This is especially true when the slitter is a rotating cutting blade. Rotating cutting blades have certain advantages, such as an ability to stay sharper longer than stationary blades. However, the frictional forces generated between the slitter and the edges of the slit can be severe. As a result, the tube tends to deform into a curved shape because the heat generated by the friction causes the polymeric material to constrict along the slit. Some systems attempt to compensate for the deformation problem by providing complex supporting devices. In particular, mandrels having passages with cooling air and/or cooling water often are used to cool the tube while forcing the tube to remain in a tubular form during processing. However, these systems involve high complexity and cost.

Another problem found in conventional systems is in applying the adhesive to the edges of the slit. In particular, puller or conveyor belts used to feed the tube through the slitter are also often used to advance the tube to a plow or roller for deforming the edges of the slit into a flat plane so that the adhesive can be sprayed or coated onto the edges. For example, U.S. Pat. No. 3,821,939 discloses an apparatus for flattening the tube so that the edges are in the same plane and a coating roll for applying adhesive to the two edges. A release liner, such as a silicone coated tape, is then applied to the slit edges to prevent the edges from adhering to each other before the tube is installed around a pipe. The tube is then allowed to return to the original tubular form so that the release liner is folded on itself between the edges of the slit. This method, however, results in extreme deformation of the tube and can result in damage to the tube caused by the collapsing or rupturing of the foamed polymeric material.

Another method for applying adhesive to the edges of the slit provides a wedging member in conjunction with a mandrel, which supports and cools the tube during processing. Such a method is disclosed in U.S. Pat. No. 5,558,739. The mandrel is sized slightly larger than the inner diameter of the tube, thus causing the edges of the slit to separate and define an acute angle therebetween. The wedging member is comprised of a pair of plates which converge at an angle matching that of the acute angle defined by the edges of the slit so that a pair of adhesive-coated tapes can be applied to the edges of the slit. This method, however, also includes the complexity and cost of a mandrel to support and cool the tube during processing. Moreover, the mandrel and wedging member must be sized to fit each tube being processed at a particular time. Accordingly, processing different sized tubes requires changing the mandrel and wedging member according to the inner diameter of each tube so that the mandrel spreads apart the edges of the slit at an appropriate acute angle and the wedging member converges at the same angle defined by the edges of the slit.

Thus, there is a need for providing a method and apparatus which avoids the problems in the prior art. More specifically, there is a need for providing a method and apparatus for slitting a tube of pipe insulation that results in frictional forces between the slitter and edges of the tube that are sufficiently low such that the tube does not substantially deform. There is also a need for providing a method and apparatus for applying an adhesive to the slit edges of a tube of pipe insulation without crushing or seriously deforming the tube to a significant degree. Such a method and apparatus would also advantageously be capable of forming a slit in a tube of pipe insulation and applying an adhesive to the slit edges thereof without internal support structures, such as mandrels and the like.

SUMMARY OF THE INVENTION

These and other needs are provided, according to the present invention, by a device having a housing member positioned such that the housing member covers at least a portion of the cutting blade and separates the edges of the slit from the cutting blade to reduce frictional engagement of the cutting blade with the edges of the slit. In addition, the housing member has exterior surfaces for receiving a pair of release tapes from tape feed paths and directing the release tapes along lines parallel to the path of travel of the tubular body so that the release tapes are adhered to the edges of the slit.

In particular, the apparatus of the present invention includes tape feeds for feeding the release tapes along tape feed paths toward the tubular body as the tubular body is advanced along a path of travel. The release tapes have an adhesive applied to at least one surface thereof. The apparatus also includes a cutting blade for cutting or slitting the tubular body as the tubular body is advanced past the cutting blade. More specifically, the housing member having the cutting blade mounted therein is positioned along the path of travel of the tubular body. As such, the slit is formed in the tubular body having a pair of opposed slit edges with the cutting blade interposed therebetween. The surfaces of the release tapes having the adhesive applied thereto are applied the edges of the slit as the release tapes are directed by the exterior surfaces of the housing member. In one embodiment, the cutting blade is a rotating cutting blade. In another embodiment, the cutting blade is stationary.

According to the present invention, the apparatus also includes an adhesive applicator for applying the adhesive to the release tapes. The apparatus may also include flared projections or thicker portions extending away from the housing member for providing urging forces against the release tapes and the corresponding edges of the slit.

Thus, the present invention provides a method and apparatus for applying adhesive to the edges of a slit tube wherein the tube is slit by a portion of the cutting blade exposed at the leading edges of the housing member such that very little frictional forces and heat are generated between the tube and the cutting blade during the slitting process. Furthermore, the present invention directs a pair of adhesive coated tapes around the leading edges of the housing member proximate the exposed portion of the cutting blade and along the parallel exterior surfaces thereof. As such, the present invention provides a novel approach for applying the adhesive to the edges of the tube having low complexity, low cost, and advantageous safety features.

BRIEF DESCRIPTION OF THE DRAWINGS

Some of the objects and advantages of the present invention having been stated, others will appear as the description proceeds when taken in conjunction with the accompanying drawings which are not necessarily drawn to scale, wherein.

DETAILED DESCRIPTION OF THE PRESENT INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
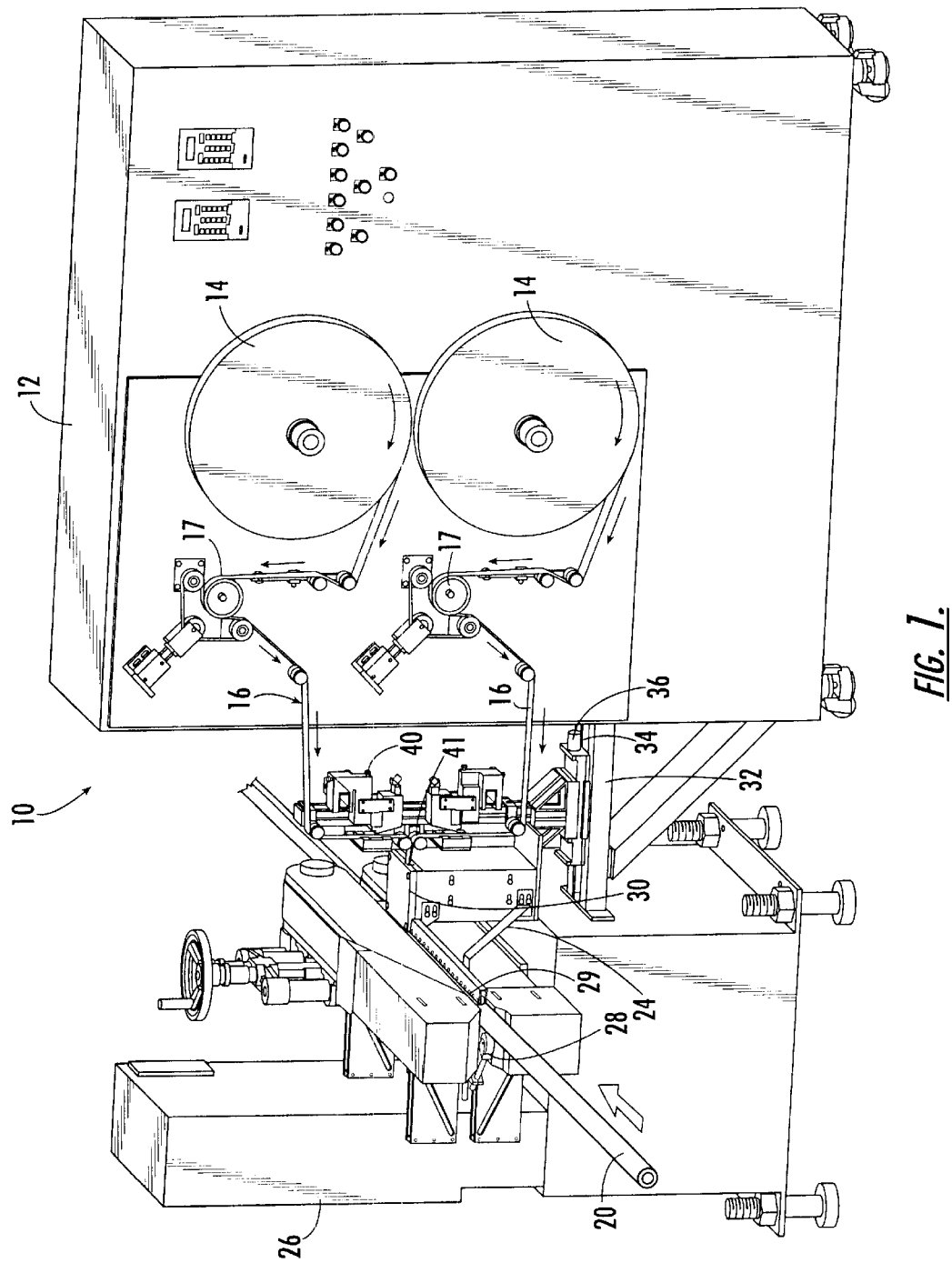
FIG. 1 is a perspective view of the apparatus according to the present invention.

Turning first to FIG. 1, there is shown a perspective view of an adhesive application apparatus 10 according to the present invention. As shown, the apparatus 10 is particularly advantageous for applying an adhesive to the edges of a slit extending along a tubular body of flexible insulation tubing 20. However, the apparatus 10 can have other forms and other applications without departing from the spirit and scope of the present invention. According to the present invention, the apparatus 10 is in a manufacturing line downstream of an extruder (not shown) that forms the tubular body 20. However, the apparatus 10 may also be used separately in an individual capacity.

Figure 2:
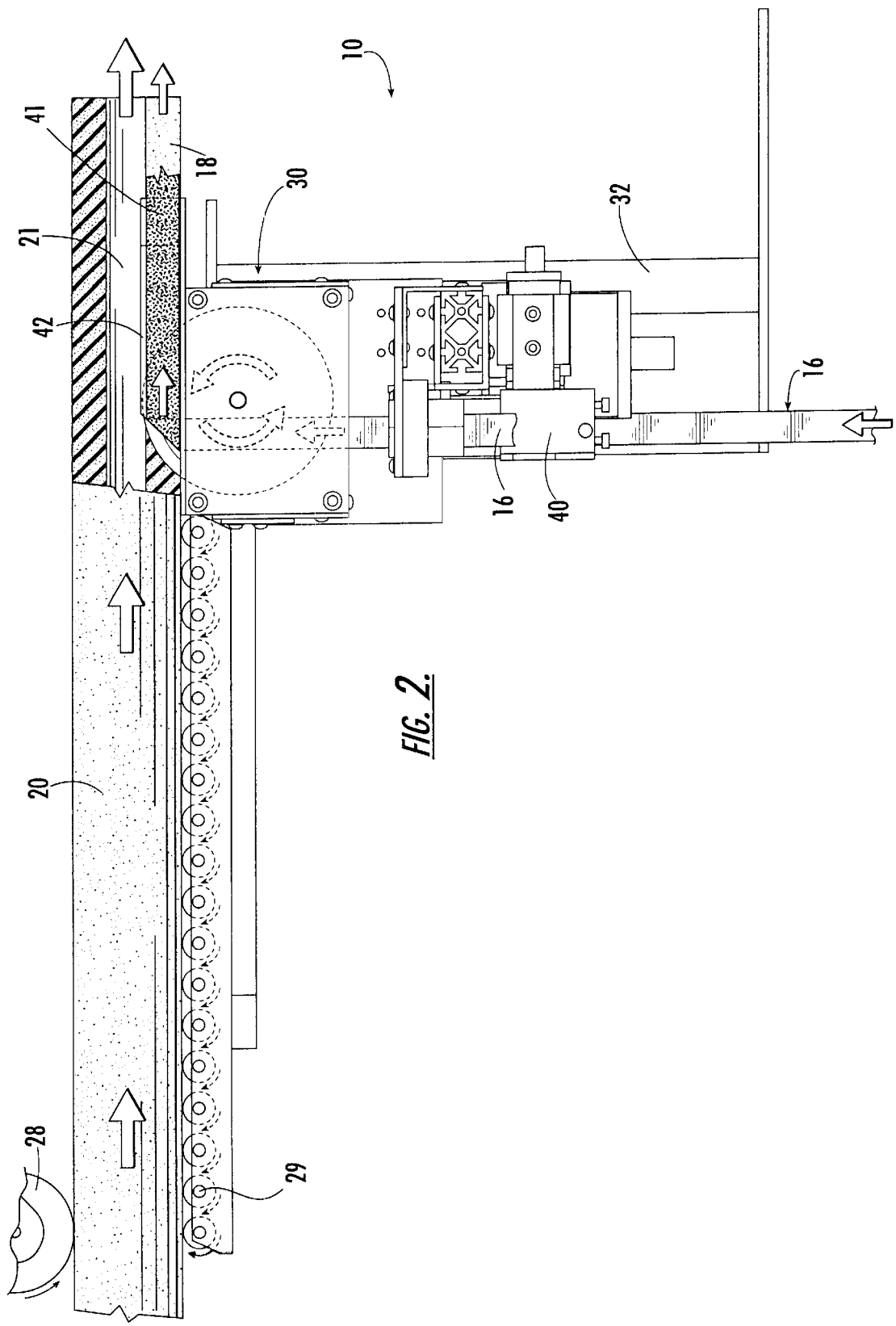
FIG. 2 is a top view of a portion of the apparatus according to one embodiment of the present invention.
Figure 3:
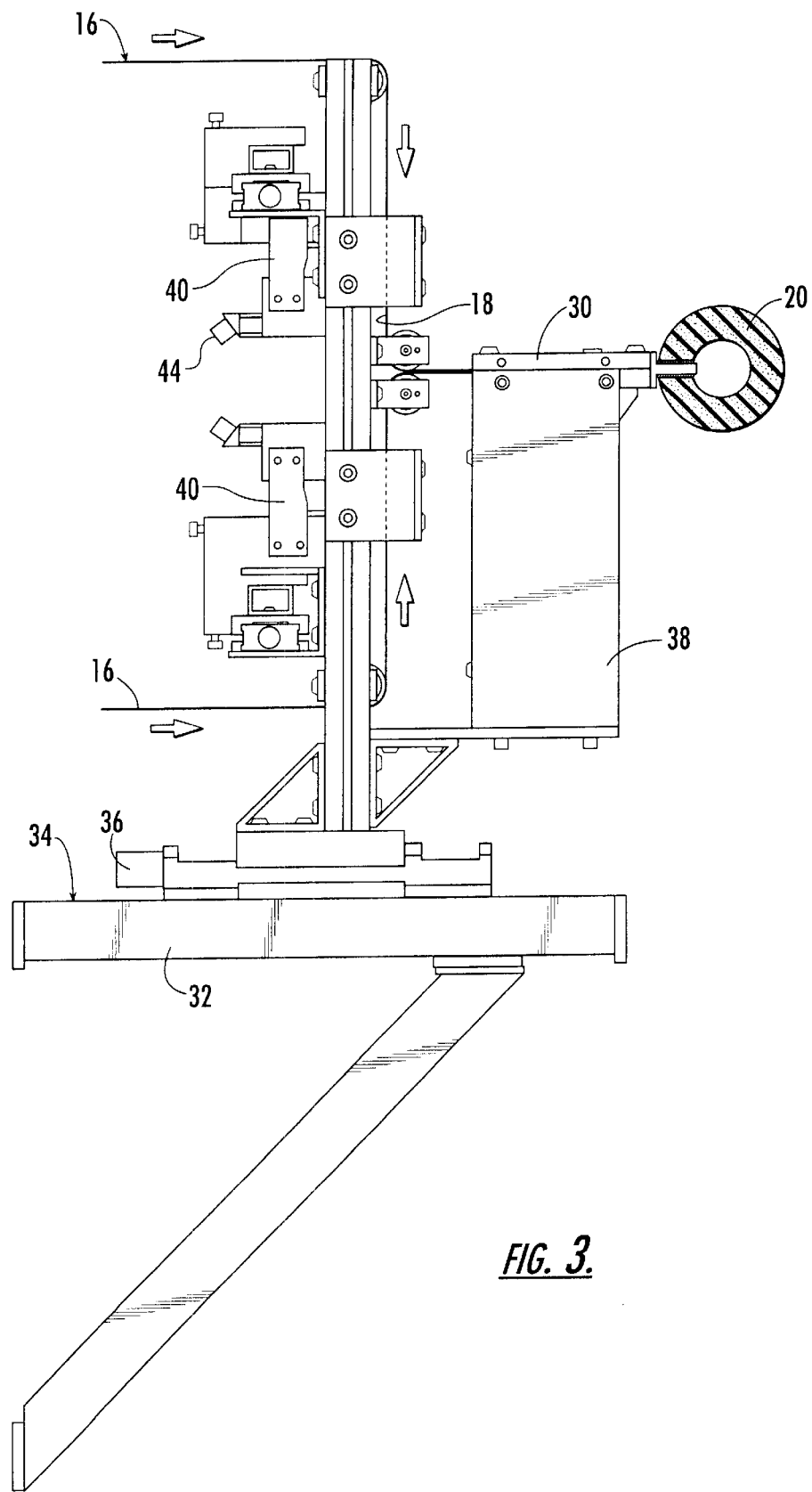
FIG. 3 is a rear view of a portion of the apparatus according to the present invention.

FIGS. 1–3 illustrate several views of the apparatus 10 according to the present invention. The apparatus 10 includes, among other components, a pair of tape reels 14 mounted to a cabinet 12. The cabinet 12 serves as a central storage unit for electronics and the like, as well as a foundation for several other components, as discussed more fully below. The apparatus 10 can be secured to an existing drive device, such as a conventional capstan 26 having a pair of opposed puller belts, using mounting brackets 24 or other securing device. As such, the capstan 26 feeds the tubular body 20 having a hollow portion 21 along a path of travel such that the tubular body operably engages the apparatus 10 via guide rollers 28, 29. Advantageously, the present invention is compatible with existing capstans in the manufacturing line of the tubular body 20, thus reducing the number of parts, lowering the cost, and increasing the reliability of the apparatus 10 relative to other tape application machines which incorporate their own drive system.

The tape reels 14 each can hold about 1500 feet of a tape, such as release tapes 16, which are directed from the tape reels along tape feed paths and toward the tubular body 20. The release tapes 16 are selected so that they each have a width equal to the width of the edges of the slit plus a nominal amount, such as about ¼–¾ inch, which has no adhesive applied thereto and provides a grasping point for removing the release tapes upon applying the tubular body 20 to a desired pipe to be insulated. In one embodiment, the tape feed paths direct the release tapes 16 into contact with a series of rollers. At least one of the rollers 17 can provide tension to the release tapes 16 so that the release tapes are payed out at a steady rate from the tape reels 14. In addition, the tape reels 14 may also be connected to a brake (not shown) or other device for providing suitable tension to the release tapes 16. The rollers and brake are not required, however, but are desirable for providing a more precise operation.

According to the present invention, the release tapes 16 are a polymeric tape, such as Mylar, although other known release tapes may also be used. The release tapes 16 include release surfaces 18 to which an adhesive 41 is applied. The release tapes 16 travel along the tape feed paths to adhesive applicators 40. The adhesive applicators 40 receive the adhesive 41 from adhesive feed lines 44 and apply the adhesive to at least a portion of the release surfaces 18 by coating, extruding, or spraying. The adhesive applicators 40 include a slot nozzle (not shown), which provides more control than a swirling nozzle found in other systems, particularly when the adhesive applicators are moved toward or away from the release surfaces 18 of the release tapes 16.

The adhesive 41 is a pressure sensitive adhesive. The pressure sensitive adhesive may be formed with the same polymer base as the tubular body 20 for providing an improved bond therebetween. In particular, a common source of failure of tubular pipe insulation is the adhesion bond between the adhesive 41 and the tubular body 20, not the cohesion bond between the adhesive applied to both edges of the slit that is pressed together to secure the tubular body around a pipe to be insulated. Generally, cohesion bonds are stronger than adhesion bonds. In this sense, an adhesion bond is defined as the bond between two bodies having different compositions, whereas a cohesion bond is defined as a fusion bond between two bodies having similar compositions. By forming the adhesive 41 from the same polymer base as the tubular body 20, a cohesion bond will result between the adhesive and the tubular body, thus creating an improved bond therebetween.

The adhesive 41 is applied at an elevated temperature so that the adhesive is sufficiently flowable. However, the temperature of the adhesive 41 may vary according to several characteristics of the apparatus 10, such as line speed, type of release tapes 16, and type of adhesive. The temperature can be varied by a mixing pot (not shown) that feeds the adhesive 41 to the adhesive applicators 40 through the adhesive feed lines 44. The temperature can also be varied by an extrusion head (not shown) of the adhesive applicators 40. As such, the present invention avoids complex feed paths as found in the prior art, such as in the apparatus described in U.S. Pat. No. 5,558,739, wherein an adhesive is applied to a tape at a relatively constant temperature upstream of the point where the tape is applied to a tube, and the tape feed path is lengthened and shortened by a complex series of guide rods in order to adjust the temperature of the adhesive when it is applied to the tube.

The apparatus 10 also includes a housing member 30. In one advantageous embodiment, the housing member 30 is slidably connected a frame 32. In particular, the frame 32 has a track 34, such that the housing member 30 may be adjusted along the track 34 and secured with a tightening device 36. This allows the housing member 30 to maintain a fixed position, yet be capable of adjustment along the track 34 according to a specific processing situation.

Figure 4:
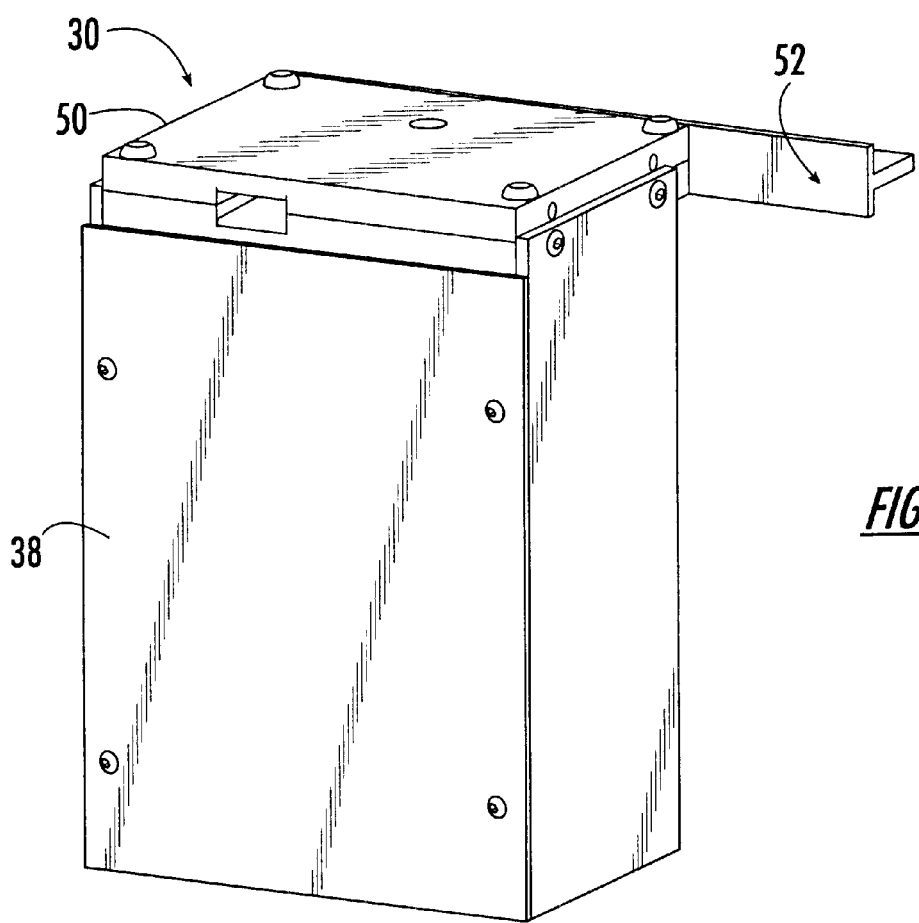
FIG. 4 is a perspective view of a housing member and cover of the apparatus according to one embodiment of the present invention.
Figure 5:
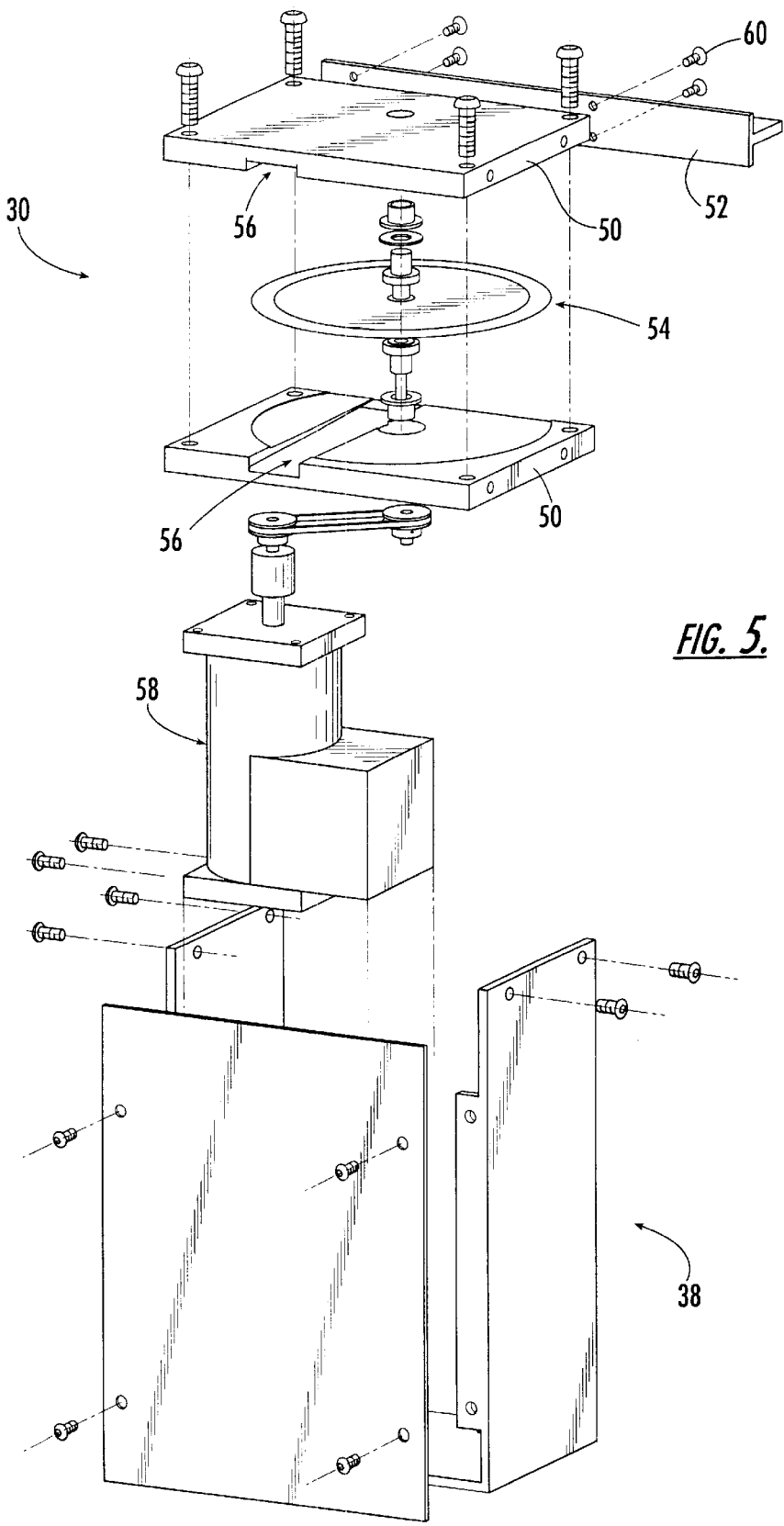
FIG. 5 is an exploded view of the view shown in FIG. 4 according to the present invention.

FIGS. 4 and 5 show the housing member 30 according to one embodiment of the present invention. As shown, the housing member 30 comprises a base portion 50 and a body portion 52 connected thereto using fasteners, such as screws 60.

Advantageously, a cutting blade 54 is mounted so as to extend within the housing member 30. In the embodiment shown in FIG. 5, the housing member 30 supports a cutting blade 54, which is mounted within the base portion 50. However, the cutting blade 54 does not have to be mounted to the housing member 30. For example, the cutting blade 54 may be mounted within the body portion 52. In one embodiment, the cutting blade 54 is a circular blade that is rotatable about a central axis 68 of the cutting blade by a motor 58. The cutting blade 54 is secured to the base portion 50 along the central axis 68 of the cutting blade by an axle and a series of separators. In another embodiment, the cutting blade 54 is stationary and has a rectangular shape, although other geometric shapes may also be used (see FIGS. 12 and 13). As shown in FIG. 5, the base portion 50 comprises two elements secured together with fasteners. However, the base portion 50 may be constructed as a single element. The base portion 50 also includes guide surfaces 56 for directing the release tapes 16 toward the tubular body 20, as discussed more fully below.

Figure 6:
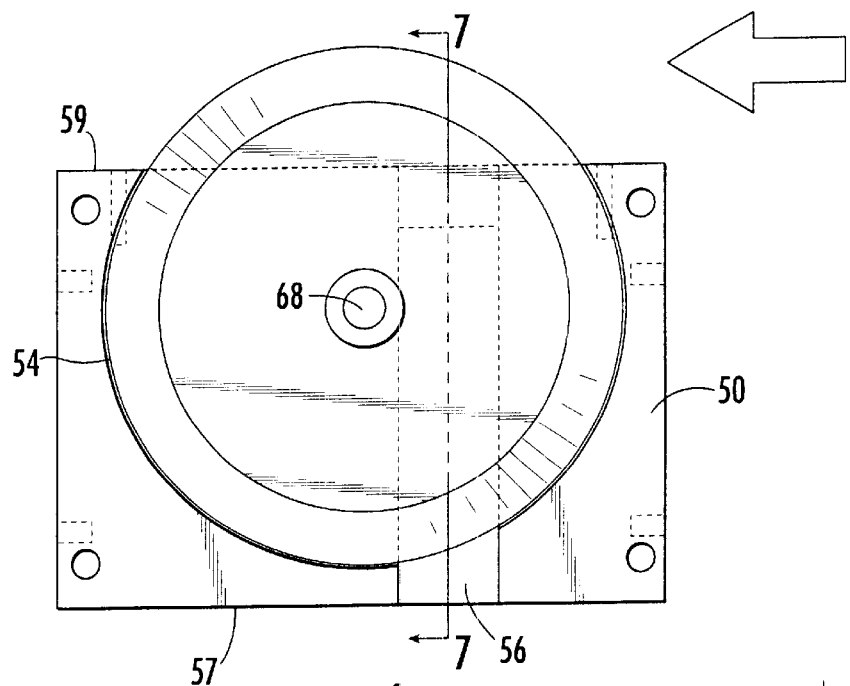
FIG. 6 is a bottom view showing features of the housing member according to one embodiment of the present invention.

FIG. 6 shows a partial view of the base portion 50 and cutting blade 54 according to one embodiment of the present invention. The cutting blade 54 is mounted in the base portion 50 at the central axis 68 and is rotated thereabout for forming a slit in the tubular body 20 as the tubular body is fed along the path of travel. The cutting blade 54 is formed of a high strength material, such as zirconia or stainless steel, although other types of materials may also be used. In one embodiment, the cutting blade is rotatable and has a diameter of about 7 inches, but the diameter may vary according to particular processing conditions. The base portion 50 includes an entry end 57 and an exit end 59 relative to the tape feed paths. The guide surfaces 56 extend between the entry end 57 and the exit end 59 for directing the release tapes 16 toward the tubular body 20.

Figure 7:
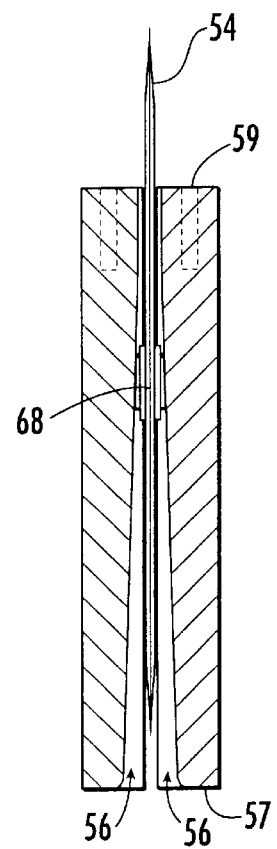
FIG. 7 is a sectional view of a base portion of the housing member according to the present invention taken along lines 7—7 of FIG. 6.

FIG. 7 shows a cross-sectional side view of one embodiment of the base portion 50 and the cutting blade 54. Although not particularly drawn to scale, the cutting blade 54 is disposed within the base portion 50 and mounted thereto at the central axis 68 of the cutting blade. The central axis 68 is positioned in the base portion 50 such that the cutting blade 54 extends past the exit end 59. The guide surfaces 56 are operable for directing the release tapes 16 through the base portion 50 by entering at the entry end 57 and exiting at the exit end 59. In particular, the release surfaces 18 enter the base portion 50 facing the cutting blade 54 and exit in a likewise manner to the body portion 52, as discussed hereinbelow. As shown, the guide surfaces 56 define acute angles relative to the cutting blade 54 at the entry end 57, such as about 2°, but are substantially parallel to the cutting blade at the exit end 59. The acute angles allow the release tapes 16 to sag or droop relatively small amounts at the entry end 57 without contacting the cutting blade 54. Alternatively, the guide surfaces 56 may be substantially parallel to the cutting blade 54 from the entry end 57 to the exit end 59 without affecting performance.

Figure 8:
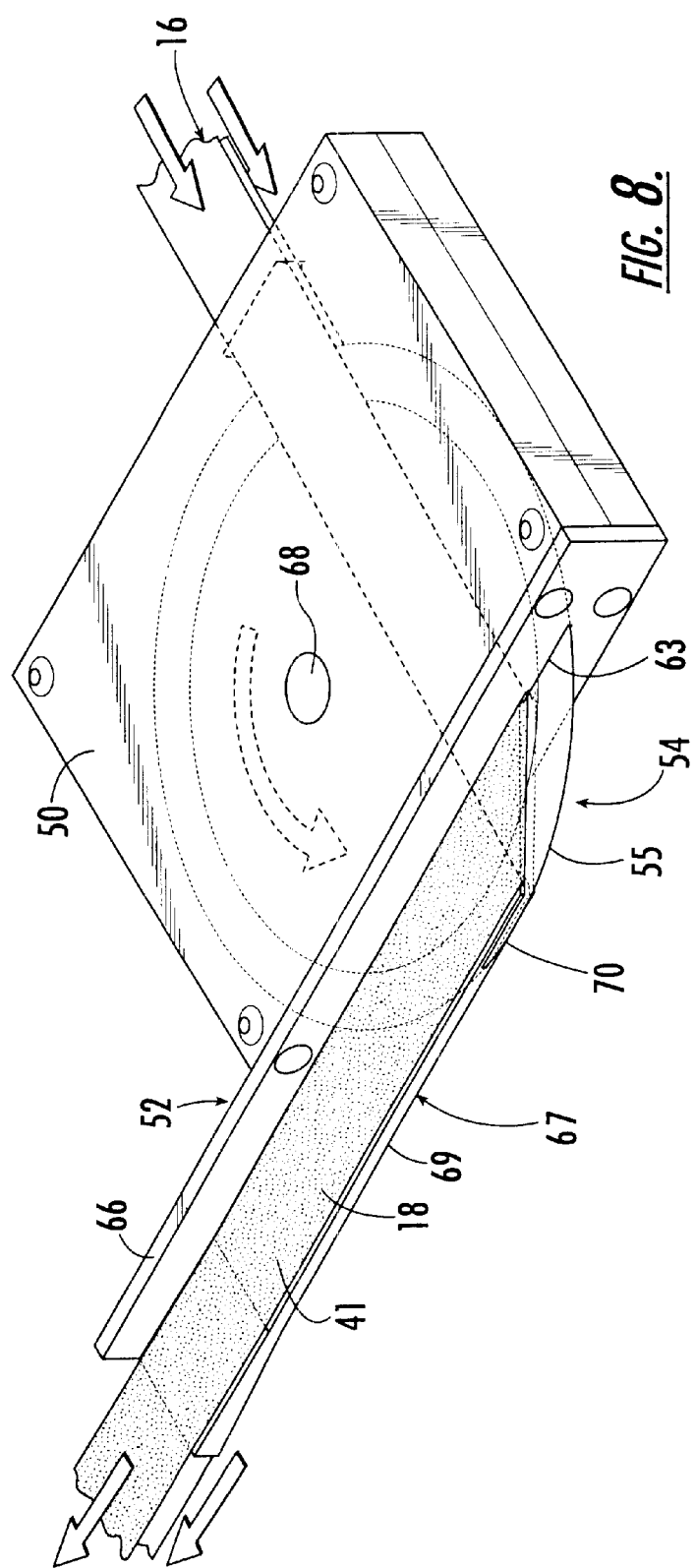
FIG. 8 is a perspective view of the base portion shown in FIG. 7 and a body portion illustrating the paths of two release tapes.

FIG. 8 shows a perspective view of the housing member 30 according to one embodiment of the present invention. In particular, the release tapes 16 having the adhesive 41 applied to the release surfaces 18 are shown entering the base portion 50 at the entry end 57 from the tape feed paths via the guide surfaces 56 and travelling along the guide surfaces to the body portion 52. The release tapes 16 exit the base portion 50 and enter the body portion 52 at an opening 63 defined therein. The opening 63 may be sized to accommodate at least the release tapes 16 and a portion of the cutting blade 54, although the opening may be smaller or larger.

FIGS. 9–12 show various illustrations of the body portion 52 of the housing member 30 according to the present invention. The body portion 52 is removably attached to the base portion 50 with screws via attachment holes 61. For ease of manufacturing, the body portion 52 is constructed of more than one piece of material, although the body portion may be made from a single piece of material. The body portion 52 comprises a support member 66 and a leg portion 67. The leg portion 67 comprises three layers secured together (not shown), although the leg portion may be machined from a single piece of material, such as by EDM techniques. The support member 66 defines the opening 63 for receiving the release tapes 16 and, in one embodiment, a portion of the cutting blade 54. In addition, the support member 66 is adapted for securing the body portion 52 to the base portion 50 via screws 60.

The leg portion 67 includes a pair of exterior surfaces 42 extending away from the support member 66 such that the opening 63 extends into the leg portion. As shown in FIGS. 9–12, the leg portion 67 includes two exterior surfaces 42 that are substantially parallel to one another, as well as a bottom surface 69. The exterior surfaces 42 are adapted for receiving the release tapes 16 and directing the release tapes along lines parallel with the path of travel of the tubular body 20. In particular, the exterior surfaces 42 are positioned such that the release tapes 16 are directed between the exterior surfaces and the tubular body 20, and the release surfaces 18 having the adhesive 41 applied thereto are applied to the edges of the slit formed in the tubular body, as discussed more fully below. The substantially parallel exterior surfaces 42 provide an advantage over exterior surfaces defining an acute angle therebetween of better radial placement of the release tapes 16 on the exterior surfaces 42. In one embodiment, the bottom surface 69 defines a slot 70 at a forward end of the bottom surface, although the cutting blade 54 does not extend through the slot 70 for safety reasons. Rather, the slot 70 provides an easy access to the cutting blade 54 for cleaning purposes.

Figure 12:
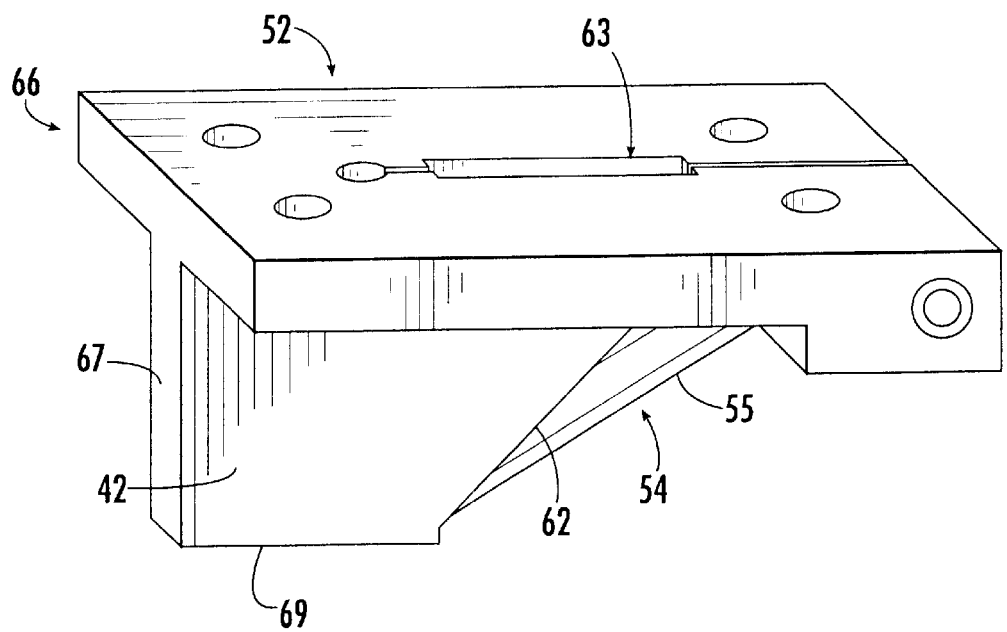
FIG. 12 is a perspective view of another embodiment of the body portion according to the present invention.

Advantageously, the leg portion 67 is positioned such that the leg portion covers a portion of the cutting blade 54 as the cutting blade extends through the body portion 52. More specifically, the cutting blade 54 extends into the body portion 52 and is partially covered downstream by the leg portion 67, thus leaving an upstream exposed cutting surface 55 to form a slit in the tubular body 20 as the tubular body is fed along the path of travel by the capstan. The exposed cutting surface 55 is best shown in FIGS. 8 and 12. The exposed cutting surface 55 is at a forward end of the body portion 52 defined by leading edges 62 of the leg portion 67 (see FIGS. 9 and 12). As such, the cutting blade 54 cuts the tubular body 20 and forms a slit having two opposing edges. The tubular body then engages the release tapes 16 on the body portion 52 at the leading edges 62 wherein the cutting blade 54 is interposed between the opposing edges. The opposing edges of the slit are then directed along the exterior surfaces 42 such that the edges are no longer in contact with the cutting blade 54, thereby reducing the friction created between the cutting blade and the tubular body 20 that is a disadvantage of conventional systems. The leading edges 62 may also serve other important functions, as described hereinbelow.

Figure 9:
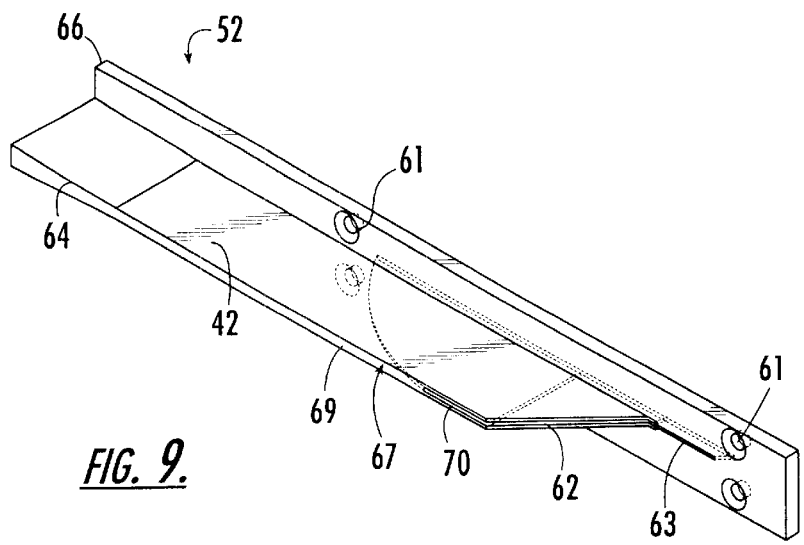
FIG. 9 is a perspective view of the body portion of the housing member according to one embodiment of the present invention.
Figure 10:
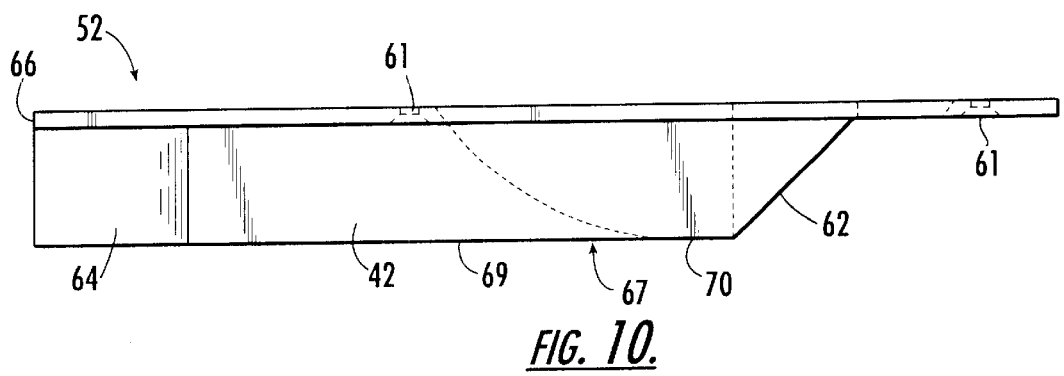
FIG. 10 is a top view of the body portion shown in FIG. 9 according to the present invention.
Figure 11:
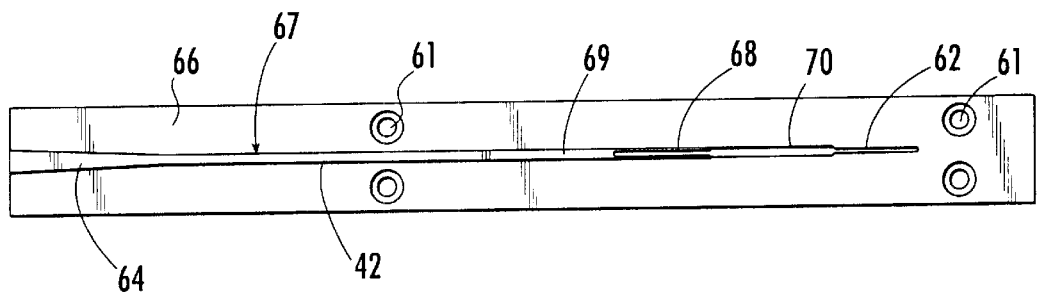
FIG. 11 is a side view of the body portion shown in FIG. 9 according to the present invention.

The leg portion 67 may also include thicker portions or projections 64 extending away from the leg portion for providing urging forces against the release tapes 16 and the tubular body 20 as the release tapes and tubular body are fed along the path of travel. As shown in FIG. 9, the projections 64 are located at a trailing end of the leg portion 67 and have a flared shape. As the tubular body 20 and the release tapes 16 applied thereto pass over the projections 64, the projections urge against the release tapes such that the release tapes are pressed toward the tubular body, thus improving the bond between the adhesive 41 and the edges of the slit. Although not necessary for practicing the invention, the projections 64 provide an added level of improvement desirable in most applications.

According to the embodiment shown in FIGS. 9–12, the leading edges 62 defined by the exterior surfaces 42 are positioned to receive the release tapes 16 from the tape feed paths via the guide surfaces 56 and direct the release tapes around the leading edges 62 approximately 90° so that the release tapes travel along the exterior surfaces 42 in lines parallel to the path of travel such that the adhesive 41 is applied to the edges of the slit formed in the tubular body 20.

The leading edges 62 and guide surfaces 56 may be sized slightly larger than the release tapes 16, so that the release tapes 16 may move laterally within the guide surfaces 56 and along the leading edges 62 by laterally adjusting the tape feed paths relative to the guide surfaces 56 in a direction parallel with the path of travel of the tubular body 20. Accordingly, positioning the release tapes 16 at a certain position along the leading edges 62 determines where the release tapes 16 are applied to the edges of the slit.

Figure 13:
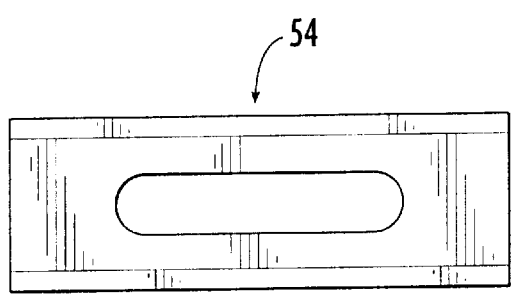
FIG. 13 is a side view of the cutting blade shown in FIG. 12.

FIGS. 12 and 13 show one embodiment of the body portion 52 according to the present invention. More specifically, FIGS. 12 and 13 illustrate the body portion 52 having a stationary blade 54 interposed between the leading edges 62 of the body portion. Such a design results in reduced costs, such as in capital expenditure, maintenance and reliability costs, compared to the design described above using a rotating cutting blade. According to the embodiment shown in FIG. 12, the stationary blade 54 is secured within the housing member 52 and is positioned at an angle between about 32°–50° relative to the path of travel of the tubular body 20, and in particular about 32°–35°. In one advantageous embodiment, the stationary blade 54 comprises zirconia, and is available from Specialty Blades, Inc. (http:\\www.specialtyblades.com).

Advantageously, the stationary blade 54 shown in FIGS. 12 and 13 allows the exterior surfaces 42 of the body portion 52 to be shorter along the path of travel of the tubular body 20 compared to a rotating cutting blade because the exterior surfaces have less surface area of the stationary blade to cover compared to the surface area of a rotating cutting blade. Furthermore, using the body portion 52 incorporating the stationary blade 54 shown in FIGS. 12 and 13 results in a reduced amount of polymer dust generated by slitting the tubular body 20 compared to incorporating a rotating cutting blade.

Figure 14:
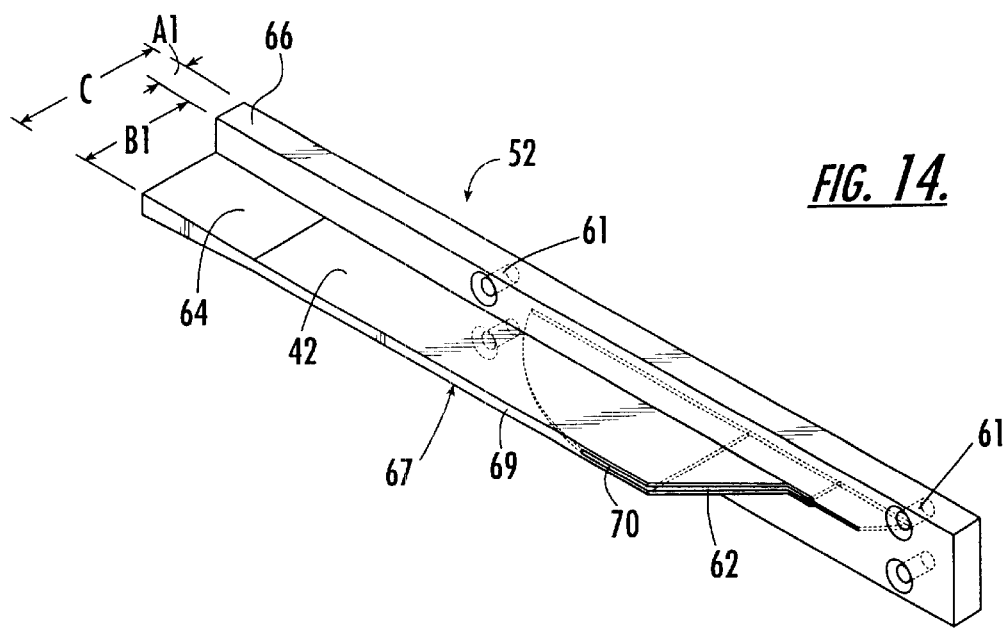
FIG. 14 is a perspective view of the body portion showing the dimensions of the support member and exterior surface according to one embodiment of the present invention.
Figure 15:
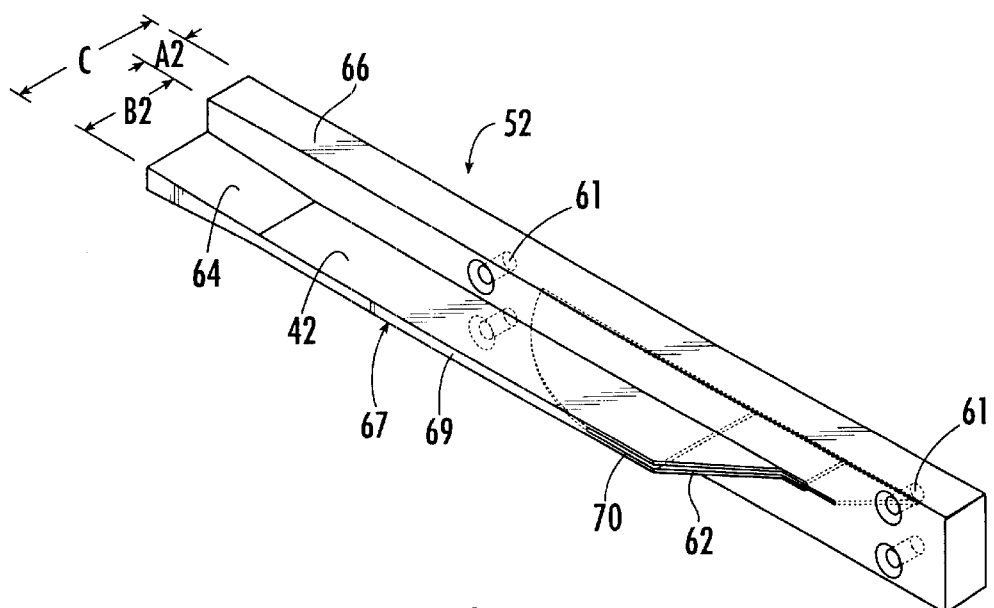
FIG. 15 is a perspective view of the body portion showing the dimensions of the support member and exterior surface according to another embodiment of the present invention.

Advantageously, the apparatus 10 allows for easy changeovers from processing one size tubular body to another size tubular body. More specifically, FIGS. 14 and 15 show two embodiments of the body portion 52 of the housing member, wherein the support member 66 and leg portion 67 may be sized according to a particularly sized tubular body. According to this embodiment, the cutting blade and base portion do not have to be exchanged when changing over from one size tubular body to another size tubular body. Further adjustments may also be made by moving the housing member 30 along the track 34 and securing the housing member thereto using the tightening device 36 (see FIG. 1).

FIGS. 14 and 15 show two embodiments of the body portion 52 to highlight the advantageous changeover feature described above. In particular, the support member 66 of the body portion 52 shown in FIG. 14 has a width along a radial axis (relative to the tube) of A1, while the leg portion 67 has a width in the same axis of B1. The overall width of the body portion 52 is shown as C. If a tubular body having a smaller diameter, for example, is to be processed, the apparatus can be easily adapted to the smaller tubular body by first removing the body portion 52 by unscrewing the screws from the base portion via the attachment holes 61 and installing a suitable body portion 52 having a relatively wider support member 66, such as the body portion shown in FIG. 15, in which the support member 66 has a width of A2. Since the overall width of the body portion 52 is maintained as C in both FIGS. 14 and 15, the width of the leg portion 67 in FIG. 15, shown as B2, is relatively less wide than B1.

Accordingly, the dimensions of the support member 66 and the leg portion 67 determine the size of the cutting surface 55 of the cutting blade 54 (see FIG. 8). In particular, the cutting surface 55 decreases as the support member 66 increases in width and the leg portion 67 decreases in width (for example, A1 to A2 and B1 to B2, respectively), while the cutting surface 55 increases as the support member decreases in width and the leg portion increases in width. Thus, the apparatus 10 may easily accommodate tubular bodies within a wide range of diameters with minimal changeover steps and simplicity of parts.

The operation of the apparatus 10 and method of slitting the tubular body 20 and applying the adhesive 41 to the edges of the slit formed in the tubular body are as follows: The tubular body 20 is fed along the path of travel by a capstan 26 or other device so that the tubular body engages the housing member 30. Concurrently, the release tapes 16 are advanced along the tape feed paths toward the tubular body 20 and the adhesive 41 is applied to the release surfaces 18 at the adhesive applicators 40. The release tapes 16 are advanced to the base portion 50 of the housing member 30 and along the guide surfaces 56 thereof toward the body portion 52.

The tubular body 20 engages the cutting surface 55 of the cutting blade 54 such that a slit having opposing edges is formed by the cutting blade, which is interposed therebetween. The release tapes 16 are advanced through the opening 53 in the body portion 52 to the leading edges 62, where the release tapes are redirected approximately 90° along the exterior surfaces 42 of the body portion. The edges of the slit pass over the leading edges 62 of the leg portion 67 so as to remove the edges from contact with the cutting blade 54. The edges of the slit engage the release tapes 16, and more specifically the release surfaces 18 having the adhesive 41 applied thereto, such that the adhesive 41 is applied to the edges of the slit. The tubular body 20 is advanced to the projections 64, wherein the projections urge the release tapes 16 against the tubular body for improving the bond between the adhesive 41 and the edges of the slit. The tubular body 20 having the adhesive 41 and release tapes 16 applied thereto may then be advanced further along the path of travel for further processing.

From the foregoing it will be seen that there has been shown and described a unique process and apparatus for forming a slit extending along a tubular body and applying an adhesive to the edges of the slit as the tubular body is advanced along a path of travel. While particular embodiments of the invention have been shown and described, it will be understood that the invention is not limited thereto since modifications may be made by those skilled in the art, particularly in light of the foregoing teachings. It is therefore contemplated by the following claims to cover any such modifications and incorporate those features which constitute the essential features of these improvements within the true spirit and the scope of the invention.

That which is claimed:

1. An apparatus for forming a slit extending along a tubular body formed of a flexible material and applying an adhesive to an edge of the slit as the tubular body is advanced along a path of travel, comprising:

a tape feed for feeding a release tape along a tape feed path toward the path of travel of the tubular body, the release tape having an adhesive applied to at least one surface thereof;

a cutting blade for cutting the tubular body as the tubular body is advanced past the cutting blade, said cutting blade forming a slit in the tubular body having a pair of opposed slit edges facing each other such that said cutting blade is interposed between the opposed edges of the slit; and a housing member positioned along the path of travel of the tubular body, said housing member having an exterior surface for receiving the release tape from the tape feed path and directing the release tape along a line parallel to the path of travel of the tubular body such that the surface of the release tape having the adhesive applied thereto is applied to the edge of the slit, said housing member further being positioned to cover at least a portion of the cutting blade and separate the edges of the slit from the cutting blade to reduce frictional engagement of the cutting blade with the tubular body.

2. An apparatus according to claim 1, wherein the exterior surface of the housing member has a leading edge at a first end of the housing member.

3. An apparatus according to claim 2, wherein the leading edge is positioned at an angle 45° relative to the path of travel of the tubular body.

4. An apparatus according to claim 1, wherein the housing member includes two exterior surfaces which are parallel to one another.

5. An apparatus according to claim 1, wherein the housing member has a first thickness and includes a thicker portion having a second thickness for providing an urging force against the release tape and tubular body.

6. An apparatus according to claim 5, wherein the thicker portion has a flared shape.

7. An apparatus according to claim 1, further comprising an adhesive applicator for applying the adhesive to the at least one surface of the release tape.

8. An apparatus according to claim 1, wherein the housing member rotatably supports the cutting blade.

9. An apparatus according to claim 1, wherein the housing member fixedly supports the cutting blade.

10. An apparatus according to claim 1, wherein the housing member defines a slot at a first end of the housing member in which at least a portion of the cutting blade is positioned.

11. An apparatus according to claim 1, wherein the housing member has a solid second end opposite a first end of the housing member.

12. An apparatus according to claim 1, wherein said cutting blade extends radially in a direction perpendicular to the path of travel of the tubular body no further than said housing member.

13. An apparatus according to claim 1, wherein the housing member is positioned such that the cutting blade is substantially horizontal.

14. An apparatus according to claim 1, wherein the housing member includes a guide surface for directing the release tape along the tape feed path.

15. An apparatus according to claim 1, wherein the adhesive and the tubular body have a common polymer base.

16. An apparatus according to claim 1, further comprising at least two interchangeable housing members each having a base portion and a body portion having respective widths for processing tubular bodies of different diameters.

17. An apparatus according to claim 16, wherein the width of the body portion of a first housing member is larger than the width of the body portion of a second housing member such that the first housing member is capable of being used in connection with a tubular body of larger diameter than the second housing member.

18. An apparatus according to claim 16, wherein the combined width of the base portion and body portion of the first housing member is equivalent to the combined width of the base portion and body portion of the second housing member.

19. An apparatus according to claim 1, wherein the cutting blade has a rectangular shape.

20. A method of manufacturing a tubular body formed of a flexible material for use in covering elongate objects, said method comprising:

advancing a tubular body along a path of travel;

moving a release tape along a tape feed path, said tape feed path extending toward said path of travel of said tubular body;

engaging the tubular body against a cutting blade defining an upstream cutting portion and a downstream portion so as to slit the tubular body as the tubular body is advanced along the path of travel;

adhering the release tape to an edge of the slit; and separating the edge of the slit from the downstream portion of the cutting blade after said cutting blade engaging step such that the downstream portion of the cutting blade does not frictionally engage the tubular body.

21. A method according to claim 20, further comprising applying an adhesive to at least a surface of the release tape using an adhesive applicator prior to adhering the release tape to the edge of the slit.

22. A method according to claim 21, wherein the adhesive applying step includes applying the adhesive to only a portion of the release tape.

23. A method according to claim 20, further comprising rotating the cutting blade.

24. A method according to claim 20, wherein said release tape adhering step includes directing the release tape from the tape feed path to an exterior surface of a housing member.

25. A method according to claim 20, further comprising turning the release tape around a leading edge of a cutting blade housing member to advance the release tape along a line parallel with the path of travel of the tubular body.

26. A method according to claim 25, wherein said turning step comprises turning the release tape around the leading edge such that the release tape approaches and departs from the leading edge in planes that are parallel.

27. A method according to claim 26, further comprising turning the release tape about 90° around the leading edge.

28. A method according to claim 20, further comprising urging the release tape against the edge of the slit after said release tape adhering step.

29. A device for forming a slit extending along a tubular body and directing a release tape having an adhesive applied thereto to an edge of the slit as the tubular body is advanced along a path of travel, comprising:

a housing member comprising,
  a base portion for attaching the housing member to a frame,
  a body portion connected to the base portion and having a leading edge for directing the release tape along an exterior surface of the body portion such that the surface of the release tape having the adhesive applied thereto is applied to an edge of the slit; and a cutting blade mounted so as to extend within said body portion, wherein said body portion is positioned to cover at least a portion of the cutting blade and separate the edge of the slit from the cutting blade to reduce frictional engagement of the cutting blade with the tubular body.

30. A device according to claim 29, wherein the body portion has a first thickness and includes a thicker portion having a second thickness for providing an urging force against the tape and tubular body.

31. A device according to claim 29, wherein the body portion includes two exterior surfaces which are parallel to one another.

32. A device according to claim 29, wherein the body portion defines a slot at a first end of the body portion in which at least a portion of the cutting blade is positioned.

33. A device according to claim 29, wherein said cutting blade extends radially in a direction perpendicular to the path of travel of the tubular body no further than said housing member.

34. An apparatus for forming a slit extending along a tubular body formed of a flexible material and applying an adhesive to an edge of the slit as the tubular body is advanced along a path of travel, comprising:

a tape feed for feeding a release tape along a tape feed path toward the path of travel of the tubular body, the release tape having an adhesive applied to at least one surface thereof;

a housing member positioned along the path of travel of the tubular body, said housing member having an exterior surface for receiving the release tape from the tape feed path and directing the release tape along a line parallel to the path of travel of the tubular body such that the surface of the release tape having the adhesive applied thereto is applied to the edge of the slit; and a cutting blade connected to said housing member for cutting the tubular body as the tubular body is advanced past the cutting blade, said cutting blade forming a slit in the tubular body having a pair of opposed slit edges facing each other such that said cutting blade is interposed between the opposed edges of the slit.

35. An apparatus according to claim 34, wherein the exterior surface of the housing member has a leading edge at a first end of the housing member.

36. An apparatus according to claim 34, wherein the housing member includes two exterior surfaces which are parallel to one another.

37. An apparatus according to claim 34, wherein the housing member fixedly supports the cutting blade.

38. An apparatus according to claim 34, wherein the housing member defines a slot at a first end of the housing member in which at least a portion of the cutting blade is positioned.

39. An apparatus according to claim 34, wherein said cutting blade comprises zirconia.

40. An apparatus according to claim 34, wherein said cutting blade is positioned at an angle about 32°–50° relative to the path of travel.

* * * * *